PREPARATION OF BARIUM STRONTIUM CALCIUM CARBONATE

Solution No. 1:
- Barium Nitrate C.P. 66.2 Gms.
- Strontium Nitrate C.P. 43.0 Gms.
- Calcium Nitrate C.P. 47.2 Gms.
- Dissolved in Distilled Water 960 ML. at 90°–100°C.
- Filtered Twice.
- Solution No. 1.
- Heated to 90°–100°C.

Solution No. 2:
- Ammonium Carbonate C.P. Lump 1100 Gms.
- Ammonium Hydroxide C.P. (s.g. .90) 470 Gms.
- Dissolved in Distilled Water 1987 ML. at 40°–50°C.
- Filtered Twice.
- Solution No. 2.
- 600 ML. Solution No. 2.
- Temp. Adjusted to 30°C.

Solution No. 2 added to Solution No. 1 at constant rate with stirring so that time of precipitation is 5 min.

Barium Strontium Calcium Carbonate plus Water, plus Ammonium Nitrate.

Transferred to Buchner Filter.

Washed with Distilled Water (90°–100°C.) until free from Nitrates.

Vacuum Filtered.

Ppt. Dried at 100°–120°C.

Bottled.

INVENTOR
M.N. FREDENBURGH

Patented Aug. 9, 1932

1,870,951

UNITED STATES PATENT OFFICE

MARK N. FREDENBURGH, OF EAST ORANGE, NEW JERSEY, ASSIGNOR TO WESTINGHOUSE LAMP COMPANY, A CORPORATION OF PENNSYLVANIA

ELECTRON EMISSION MATERIAL

Application filed July 11, 1928. Serial No. 292,037.

This invention relates to electron-emitting electrodes and more particularly to electron-emitting cathodes of the oxide coated type and comprises essentially in a process (and the product) of producing substantially pure intimately admixed alkaline earth metal carbonates which may be employed in producing alkaline earth metal oxide coated cathodes for electron-emitting purposes. The products of this invention comprise admixed alkaline earth metal carbonates to which have been imparted a preferred and definite crystal structure not heretofore obtainable and the oxide coated cathode prepared therefrom.

This invention is an improvement of the process of preparing electron-emitting cathodes as set forth in the patent of Duncan MacRae, No. 1,812,103, entitled "Electron-emitting devices and method of making," which patent is assigned to the Westinghouse Lamp Company, the assignee of the present application.

The process described in said patent contemplates applying a coating of alkaline earth metal carbonates to the surface of a metallic cathode by forming an inorganic suspension of the carbonates in water or other suitable liquid which is inert with respect to the carbonates and which may be removed by heat without decomposition. Thereafter the composite cathode is suitably heated in an atmosphere of carbon dioxide to cause the coated material to adhere to the metal base and to remove the suspension medium. This coating process may be repeated any number of times so as to obtain heavier deposits of the alkaline earth metal carbonates and may be made a continuous one if desired.

The resulting coating being comprised of alkaline earth metal carbonates is stable and unaffected by atmospheric gases and cathodes so coated may be kept indefinitely without deterioration before being incorporated in an electron discharge device. After being mounted in an electron discharge device, this carbonate coating may be rendered in an electronically active condition by highly heating the composite cathode during the exhaust procedure whereby the carbon oxide content of the coating is substantially removed, leaving a residue of anhydrous alkaline earth metal oxides which are adherent to the surface of the metal base.

In the practice of the process as disclosed in said patent it has been found that the dispersion, purity, particle size, relative proportions of the component alkaline earth metal carbonates, etc., exert a considerable influence on the application of the carbonate to the filament, as well as in effecting the efficiency and life of the electron emission of the hot composite cathode.

In the process of coating as disclosed in said patent the preferred admixture of alkaline earth metal carbonates employed is comprised of barium and strontium carbonates, although other admixtures of the alkaline earth metal carbonates are anticipated as falling within the scope of the coating composition.

The common practice heretofore has been to employ any commercial grade of chemically pure alkaline earth metal carbonate as may be purchaseable upon the market, comminute the same, admix mechanically in the desired proportion and thereafter form an emulsion or suspension of the admixed materials in the desired medium for coating.

Separate and independent lots of carbonate material as obtained on the market were found to vary widely in the degree of purity, particle size, absorbtive properties towards the carrier fluid and density, etc., which caused variable results with respect to the life and efficiency of the resultant electron discharge device within which the coated cathodes were employed. Moreover, at times difficulty was experienced in obtaining a uniform admixture of the carbonates without too finely comminuting the particles during the admixing process. Some difficulty was also experienced in maintaining during the coating operation a uniform mix of the component carbonates.

One of the objects of this invention is to reduce the variable operating characteristics heretofore encountered in hot cathodes of the oxide coated type.

Another object of this invention is to provide a high grade coating material for oxide coated cathodes which is comprised of uniformly admixed substantially pure carbonates of the alkaline earth metals.

Another object of this invention is to provide a coating material for oxide coated filaments comprised of intimately admixed alkaline earth metal carbonates which is uniform in composition, of a coarsely crystalline structure and of a high degree of purity.

Another object of this invention is to provide an oxide coated cathode comprised of a refractory metal filament base and a coating of alkaline earth metal oxides in such a physical state of intimate admixture, purity, particle size, etc., that uniform operating results are obtained therefrom.

Another object of this invention is to provide a commercial process for preparing the substantially pure carbonates of the alkaline earth metals in an intimately admixed state and in a coarse grained crystalline form which process would be operable to produce this product consistently.

Other objects and advantages will be apparent as the process is more fully disclosed.

In preparing oxide coated cathodes of the character falling within the scope of this invention, the physical state of the admixed carbonates of the alkaline earth metals has a pronounced effect upon the operating characteristics of the composite cathode. It is desirable from many standpoints to obtain a highly intimate dispersed admixture of the carbonate materialfi more intimate than is obtainable by mechanical admixture. It is also desirable to retain a relatively coarse but uniform particle size of the admixed carbonates, which is practically impossible to obtain by mechanical admixture means. It is necessary to retain a high degree of purity in the components of the coating material.

Whereas heretofore it has not been thoroughly understood as to which of the alkaline earth metal oxides the phenomena of electron emission is due, recent researches have indicated that in a composite oxide coating such as may be formed by this process the emission quality at the present operating temperatures is due to the barium component thereof. It is commonly considered that the function of the remaining component or components (SrO and CaO) is in the nature of an inert or retaining structure serving either as a carrier for the electron-emitting constituent, a dilutant or as a dispersing medium. It is essential that the activating constituent of the filament (BaO) be present in the oxide coating in a finely dispersed condition for best electron emission results.

The preparation of pure barium, strontium and calcium carbonates may be accomplished by adding to an aqueous solution of the pure nitrates, a solution of alkali metal or ammonium carbonates. The physical nature of the precipitated material varies with the constants of precipitation, such as temperature, pressure, concentration of the two solutions and speed of mixing.

When barium carbonate alone is prepared by this general method the product produced, regardless of the physical constants of precipitation when dried, is always more or less fluffy and finely divided. When strontium carbonate alone is prepared by this general method, variation in precipitation conditions may produce a material either dense or light and fluffy. When admixtures of barium and strontium carbonates which heretofore have been employed as a coating material in this process are formed by simultaneous precipitation, the density and physical structure of the precipitate may be caused to vary widely by varying the precipitation conditions.

This variation in density of the carbonates, due to variable precipitation conditions, effects primarily the absorbent or suspension properties of the material, thus altering the coating procedures considerably.

When calcium carbonate alone is prepared by this general method the effect of the physical constants of precipitation upon the crystal structure of the resultant product is pronounced. By varying the precipitation conditions, two crystal forms or admixtures of these two forms of calcium carbonate may be obtained.

The more common and stable form is calcite which may be precipitated normally from cold or medium warm solutions. Aragonite, which is the second form of calcium carbonate, may be precipitated when the temperature of the calcium solution is held above 85° C. during precipitation.

I have determined that the aragonite crystal structure of the calcium carbonate may be obtained readily when precipitated simultaneously with either one or both of the other alkaline earth metal carbonates and that the precipitation of the aragonite crystal form of calcium has a pronounced effect upon the crystal structure of the simultaneously precipitated admixed alkaline earth carbonates. I have found that the addition of calcium salts to admixed barium and strontium solutions and simultaneous precipitation of the three alkaline earth metals under such conditions that the aragonite type of crystal structure is developed, completely alters the size of and the physical state of the barium and strontium carbonates and they partake of the same type of crystal structure as the calcium, and form isomorphous crystals of strontianite and witherite which also belong to the rhombic system of crystallization. Such a precipitation or formation of this rhombic crystal structure is not normally obtained by precipitating the barium and strontium alone under the same conditions. This effect on the crystal structure of the aggregate precipitate is increasingly pronounced with increased calcium content becoming apparent with as little as .5% CaCO₃ and increasing until at approximately 10 to 20% calcium the desirable effect on the crystal structure which is desirable for the purpose of my invention is obtained. Larger percentages than 20 percent CaCO₃ may be employed but are not essential to produce the effect which I have utilized in the practice of my invention serving only to increase the degree of coarsening of the individual crystals of the precipitated carbonates.

I have also determined that the rate of precipitation has a direct bearing upon the ultimate particle size and particle size contrast and for the purpose of my invention it appears desirable to effect the production of the admixed carbonates in such a manner as to cause the resulting crystals to be of nearly the same size and have at least a constant maximum particle size contrast. The percent calcium present in the solution (dilution) controls the maximum obtainable particle size whereas the rate of precipitation controls the particle size contrast.

It is common practice in many arts in order to obtain intimate mixtures of two or more components to simultaneously precipitate the components from aqueous solutions. Intimate admixtures of the alkaline earth carbonates may be prepared in this manner, but I have determined, however, that simultaneous precipitation of alkaline earth metal carbonates alone does not accomplish the desired effect as the crystal structure and particle size contrast of the material is an important factor in the preparation of and subsequent activation of oxide coated cathodes by this method. Simultaneous precipitation of the carbonates must be accomplished under the certain conditions of temperature of solutions, dilution of solution, component admixtures, rate of precipitation, etc., so as to cause the formation of a definite physical state (particle size) and crystalline structure of the precipitate.

In order to ensure absolute purity in the resultant carbonate product, precipitation with alkali metal carbonates should be avoided. I prefer to employ ammonium carbonate and have found that the normal ammonium carbonate is a preferable compound to employ. The occlusion of any amount of this compound in the crystal product is not detrimental to the product as the components of the ammonium compound are readily decomposed and volatile in vacuo.

Another factor influencing my process from a commercial standpoint is the factor of dilution of solution, that is, the proportion of solids therein. Should the process of precipitation be conducted in too concentrated a solution, difficulty in preventing occlusion of impurities in the crystal structure is encountered. This occlusion of impurities decreases with increased dilution until at approximately a concentration of 15.0 percent solids per 100 cc. solution a dilution is obtained which when precipitated with ammonium carbonate may be readily handled on a commercial scale and yield a product substantially free of occluded impurities. Greater or lesser dilutions may be employed however, without departing from the nature of my invention as regards the specific use of calcium as the extent of dilution has no apparent effect on the effect of the aragonite structure formation on the admixed barium and strontium precipitates.

Having broadly outlined the scope and nature of my invention I will specifically describe my process as developed to form an admixture of alkaline earth metal carbonates which may be utilized as the coating material on hot cathodes in electron discharge devices.

I first form a solution of the mixed nitrates of the alkaline earth metal containing approximately 15.0 percent total solids comprised as follows:—

Barium nitrate (C. P. anhydrous) _____ 66.2 gms.
Strontium nitrate (C. P. anhydrous) _____ 43.0 gms.
Calcium nitrate (C. P. 4 H₂O) _____ 47.2 gms.
Distilled water _____ 960 m. l.

The nitrates are dissolved in the water contained in a Pyrex glass beaker of two liters capacity, by heating to 80° C. The solution is then filtered twice by gravity through a No. 14 Whatman filter paper. This solution I will refer to as solution #I.

As previously noted, other concentrations of solution may be employed if desired, but I have found that in general the difficulty of washing free of impurities increases with increased concentration of total solids and that this concentration is most satisfactory from all standpoints.

I next prepare a solution of normal ammonium carbonate (Spec. Grav. 1.130 at 25° C.). This solution is prepared as follows:—

Ammonium carbonate (C. P. lump) _____ 1100 gms.
Ammonium hydroxide (C. P. S. G. 90) _____ 470 m. l.
Distilled water _____ 1987 m. l.

The ammonium hydroxide is added to the distilled water contained in a Pyrex glass beaker of 4 liters capacity, the ammonium carbonate is then added and the contents heated to and maintained at approximately 40° C., with occasional stirring until solution is complete. The solution is then filtered twice by gravity through a No. 14 Whatman filter paper. This solution I will refer to as solution #II.

In preparing the precipitated carbonates of the alkaline earth metals by my process I first heat solution #I in a Pyrex glass beaker of two liters capacity to a temperature not less than 90° C. To this heated solution I add at a constant rate 200 m. l. of solution #II which has been preheated to 30° C., maintaining at all times a vigorous agitation of the solution during precipitation. With this particular proportionate mixture of alkaline earth metal carbonates I have found that the rate of addition of the normal ammonium carbonate solution to effect precipitation of the carbonates should be such that total addition of the 200 m. l. of solution II be effected in approximately one minute. This rate of precipitation is the factor which appears to directly effect the particle size differences in the crystals of the precipitate and should be maintained a constant factor between successive precipitations.

With other dilutions of solution or relative proportion of barium to strontium to calcium therein this rate may be varied. The temperature of the solution, however, must be maintained above 85° C. and preferably between 90° and 100° C. at all times during precipitation in order to obtain the preferred crystal structure of the precipitate.

After precipitation, the material is allowed to settle, the clear liquid decanted, and the material then washed into a Büchner funnel fitted with No. 50 Whatman filter paper. The material should be thoroughly washed with hot water on the filter until free from nitrates and the excess moisture removed by application of vacuum to the filter. The particular coarsely crystalline structure which I obtain by my process facilitates washing free of impurities by permitting rapid passage of the washing fluid through the pores of the precipitate and filter.

The precipitate is then transferred to a Pyrex glass tray and dried at approximately 110° C. When thoroughly dried and anhydrous, the composition of this material will be 50% barium carbonate, 30% strontium carbonate and 20% calcium carbonate. The material, although coarsely crystalline and rather dense, will readily pass a 325 mesh screen without any milling.

This material is now ready for the coating process which is described in the previously mentioned patent of Duncan MacRae, No. 1,812,103.

As before stated that in addition to the necessity of obtaining a coating material in which the activating constituent thereof (barium) is finely disseminated throughout the mass, it is also necessary to maintain a certain degree of coarseness or particle size within the coating material.

The exact reasons therefore are not at this time thoroughly understood but it is known that the electronic efficiency of an oxide-coated filament of the type contemplated within the scope of this invention decreases with the decrease in particle size of the coating material. The preferred particle size of any particular coating composition is dependent upon that composition and may only be determined by experiment.

By my process of preparing the carbonates by simultaneously precipitating the admixed alkaline earth metals in such a manner as to cause the formation of a coarsely crystalline product thereof and by regulating the precipitating time interval to hold the individual particle sizes within a certain narrow particle size range, I am enabled to subsequently subdivide the said crystals to any preferred particle size by proper supervision over the milling operation. In this manner I subdivide the crystalline precipitate to a degree which gives the best results when the material is applied to and utilized on a hot cathode in an electron discharge device.

I employ the following method in preparing a suspension of the carbonate material for coating a filament of the size which is employed in electron discharge devices of the power tube type, known to the trade as the 171—A tube, in which the filament has the dimensional measurement of approximately .0047×.00075 inches.

I prepare an admixture of 95 grams of the dry anhydrous carbonates with 50 m.l. distilled water. To this material I add a suitable binder material such as barium nitrate or barium nitrite in amounts up to 5.0 per cent (by weight). I prefer to employ as a binder the barium nitrite $(Ba(NO_2)_2)$ as this compound melts and dissociates in vacuo at a lower temperature than the nitrate compound giving thereby a bonding action at a lower temperature.

This mixture I place in a porcelain ball mill of approximately one quart capacity containing approximately 700 grams of flint pebbles of from ¼ to ½ inches in diameter. The mill is then revolved at a rate of approximately 100 R. P. M. for a period of 1½ to four hours. The ball milled carbonates are then placed in the coating cups and the filamentary cathodes coated by a continuous process substantially as described in the patent of Duncan MacRae, No. 1,812,103.

To obtain suitable deposits of the alkaline earth metal carbonates upon the filamentary material above mentioned, it is not necessary to pass the filament through the process more than four times to obtain a deposit weighing approximately 1.0 m. g. per 10 c. m. (± 10%). The speed through the coating cup is maintained at approximately 12 meters per minute and the temperature of the drying ovens through which $CO_2$ is continually passed is maintained at from 700° to 900° C.

I am enabled to retain in the coating, the crystalline character of the carbonate material until it is subjected to complete decomposition during the evacuation procedure of the electron discharge device of which it is an incorporated part.

Owing to the fact that the anhydrous oxides of the alkaline earth metals rapidly absorb moisture and $CO_2$ from the air, it is difficult to detect physical differences from oxide coated filamentary cathodes prepared from carbonates produced by the practice of my invention, and cathodes prepared from carbonates produced by other processes after the same have been decomposed in vacuo to the alkaline earth metal oxides.

I have found that cathodes formed of carbonates prepared by my process exhibit a greater uniformity in operating efficiency, life and maintenance over oxide coated cathodes heretofore prepared. In addition thereto the electronic efficiency, life and maintenance of cathodes is more consistent and reliable from lot to lot than heretofore obtainable.

While I do not want to be restricted to any theory I believe the unusual and excellent results I obtain from the use of the carbonate product of my invention is due to the fact that I obtain in the practice of my invention, a coating material in which the activating constituent (barium) is finely and uniformly dispersed throughout and in addition thereto the nature of the crystal structure of the precipitate and the permissible control over the ultimate particle size thereof which may comprise the actual coating on the cathode permits me to develop the maximum adhesive and electron emissive properties of the coating material.

Whereas I have disclosed a specific process for preparing an alkaline earth metal carbonate material for electron emission purposes and given the details of the process of coating the same upon a filamentary cathode, it is obvious that there may be many variations made in the specific steps employed and the composition of the coating material employed therein without departing from the nature of my invention and such variations are anticipated as may fall within the following claims.

What is claimed is:

1. The method of forming intimate admixtures of alkaline earth metal carbonates which comprises forming a solution of barium, strontium and calcium salts in the desired proportion, heating the solution to temperatures approximating but in excess to 85° C. and simultaneously precipitating therefrom the alkaline earth metals as a carbonate by the addition of a solution of normal ammonium carbonate.

2. The process of forming an intimate mixture of substantially pure barium and strontium carbonates containing not less than .5 per cent calcium carbonates in a crystalline form isomorphous with the aragonite crystal structure of calcium carbonate which comprises admixing soluble salts of those metals in the desired proportion to form approximately 15.0 percent solution, simultaneously precipitating the alkaline earth metal carbonates therefrom in a minimum interval of time through the addition thereto of a warm solution of normal ammonium carbonate, and maintaining during said precipitation procedure a solution temperature approximating but higher than 85° C.

3. The process of forming intimate mixtures of alkaline earth metal carbonates isomorphous with respect to the aragonite crystal structure of calcium carbonate which comprises forming a dilute water solution of barium and strontium nitrates in desired relative proportions adding thereto from .5% to 20% calcium nitrate, heating the solution to temperatures approximating but higher than 85° C., simultaneously precipitating the alkaline earth metals as carbonates therefrom by adding thereto at a constant rate a warm solution of normal ammonium carbonate.

4. An electrode having a coating, comprising a mixture of substantially pure alkaline earth metal carbonates having a crystal structure isomorphous to aragonite.

5. A coated filament suitable for use in an electron discharge device formed of about 50% of barium carbonate, 30% of strontium carbonate and about 20% of calcium carbonate, said carbonate material being comprised of fractured crystals of substantially pure aragonite and isomorphous strontianite and witherite.

6. An electrode having a coating comprising of the carbonates of at least one of the alkaline earth metals barium or strontium associated with calcium carbonate in amounts above approximately .5 percent the crystal structure of said material being substantially isomorphous with calcium carbonate in the aragonite crystal form.

7. As an article of manufacture, admixtures of alkaline earth metal carbonates containing at least .5 percent calcium carbonate in which the calcium carbonate thereof is identifiable as belonging to the rhombic system of crystal structure of the orthorhombic bipyramidal class, and the barium and strontium carbonates isomorphous thereto.

8. As an article of manufacture, admixtures of alkaline earth metal carbonates containing at least .5 percent calcium carbonate in which the calcium carbonate thereof is identifiable as belonging to the rhombic system of crystal structure of the orthorhombic bipyramidal class, and the barium and strontium carbonates isomorphous thereto, said material containing up to .5 percent barium nitrite as a binder material.

9. A coating material for use in forming cathodes of the oxide coated type comprised of approximately 50 per cent barium carbonate, approximately 30 per cent strontium carbonate, about 20% calcium carbonate and containing approximately .5% barium nitrite.

10. The method of forming intimate admixtures of alkaline earth metal carbonates having a crystal structure, isomorphous to calcium carbonate in the aragonite form, which comprises forming an aqueous solution of alkaline earth metal compounds admixed in the desired proportions, precipitating said solution with normal ammonium carbonate maintaining during said precipitation a solution temperature of about 85° C.

11. The method of forming intimate admixtures of alkaline earth metal carbonates having a crystal structure isomorphous to calcium carbonate in the aragonite form and having a predetermined particle size contrast which comprises forming an aqueous solution of alkaline earth metal compounds admixed in the desired proportions, precipitating said solution with normal ammonium carbonate, maintaining during said precipitation a solution temperature of about 85° C. and limiting the time interval of completion of said precipitation.

12. The method of forming coarsely crystalline intimate admixtures of alkaline earth metal carbonates which are suitable for use in the forming of electron emitting oxide coated type cathodes, which comprises forming an aqueous solution of barium and strontium salts in the desired proportions, adding thereto from .5 to 20.0 per cent calcium salts, precipitating said solution with normal ammonium carbonate, maintaining during said precipitating reaction a solution temperature not less than about 85° C.

13. The method of forming coarsely crystalline intimate admixtures of alkaline earth metal carbonates suitable for use in the forming of electron emitting oxide coated type cathodes which comprises forming a dilute aqueous solution containing barium and strontium salts in the desired proportion, adding thereto from .5 to 20 per cent water soluble calcium salts, precipitating said solution with normal ammonium carbonate, maintaining a solution temperature during said precipitation of not less than 85° C., and limiting the time interval of the completion of the precipitating reaction.

14. The method of forming substantially pure coarsely crystalline intimate admixed alkaline earth metal carbonate admixtures which comprises preparing about a 15 per cent aqueous solution containing barium and strontium nitrates in approximately equal amounts and from .5 to 20.0 per cent calcium nitrate, heating said solution to temperatures approximating 85° C., adding thereto a solution of normal ammonium carbonate in excess to effect the separation of the alkaline earth metal carbonate compounds and recovering the precipitated carbonate compounds therefrom in any suitable manner.

15. The method of forming coarsely crystalline intimate admixtures of alkaline earth metal carbonate compounds which comprises precipitating an aqueous solution of barium, strontium, and calcium salts admixed in the desired proportion with a solution of normal ammonium carbonate, while maintaining solution temperatures above approximately 85° C.

16. The method of preparing coarsely crystalline intimate admixtures of alkaline earth metal carbonate compounds which comprises effecting the separation of said carbonate compounds at temperatures above about 85° C. from an aqueous solution containing their salts admixed in the desired proportion by the addition thereto of a solution of normal ammonium carbonate.

17. The method of preparing coarsely crystalline intimate admixtures of alkaline earth metal carbonate compounds of predetermined particle size contrast which comprises effecting the separation of said carbonate compounds at temperatures above about 85° C. in a predetermined time interval from an aqueous solution of their salts admixed in the desired proportion by the addition thereto of a solution of normal ammonium carbonate.

18. A coating composition from which electronically active cathodes may be produced comprising a suspension of substantially pure alkaline earth metal carbonate compounds the crystal structure of said carbonates being isomorphous to that of aragonite.

19. A coating composition from which electronically active cathodes may be produced comprising a suspension of barium and strontium carbonate in approximately equal proportions and from .5 to 20 per cent calcium carbonate, the crystal structure of said calcium carbonate being that of aragonite and the crystal structure of the barium and strontium carbonates isomorphous thereto.

In testimony whereof, I have hereunto subscribed my name this 10th day of July 1928.

MARK N. FREDENBURGH.